(12) United States Patent
Heo

(10) Patent No.: US 7,080,843 B2
(45) Date of Patent: Jul. 25, 2006

(54) DECOUPLED ANTI-ROLL SYSTEM

(75) Inventor: Jin-Hyuck Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 266 days.

(21) Appl. No.: 10/713,731

(22) Filed: Nov. 14, 2003

(65) Prior Publication Data

US 2004/0195796 A1    Oct. 7, 2004

(30) Foreign Application Priority Data

Apr. 3, 2003   (KR) .................... 10-2003-0021019

(51) Int. Cl.
     *B60G 21/055* (2006.01)
(52) U.S. Cl. ............... 280/5.508; 280/5.511; 280/5.506; 280/124.107; 280/124.166
(58) Field of Classification Search ......... 280/124.107, 280/124.106, 124.166, 5.508, 5.511, 5.506
     See application file for complete search history.

(56) References Cited

U.S. PATENT DOCUMENTS

| 4,206,935 | A | | 6/1980 | Sheppard et al. | |
|---|---|---|---|---|---|
| 4,648,620 | A | * | 3/1987 | Nuss | 280/5.511 |
| 4,919,444 | A | * | 4/1990 | Leiber et al. | 280/5.511 |
| 5,785,344 | A | | 7/1998 | Vandewal et al. | |
| 6,149,166 | A | * | 11/2000 | Struss et al. | 280/5.511 |
| 6,425,585 | B1 | * | 7/2002 | Schuelke et al. | 280/5.511 |
| 6,481,732 | B1 | | 11/2002 | Hawkins et al. | |
| 6,511,085 | B1 | | 1/2003 | Sawai | |
| 6,530,586 | B1 | | 3/2003 | Fader et al. | |
| 6,637,757 | B1 | * | 10/2003 | Ignatius et al. | 280/5.511 |
| 6,811,166 | B1 | * | 11/2004 | Carlstedt et al. | 280/124.152 |
| 6,951,341 | B1 | * | 10/2005 | Beetz et al. | 280/5.511 |
| 2002/0121748 | A1 | | 9/2002 | Ignatius | |
| 2004/0169346 | A1 | * | 9/2004 | Ersoy et al. | 280/124.107 |

FOREIGN PATENT DOCUMENTS

| DE | 3740244 | C2 | | 2/1990 |
|---|---|---|---|---|
| DE | 19500869 | A1 | | 7/1995 |
| DE | 19705809 | C2 | | 10/2000 |
| EP | 1 236 592 | | * | 2/2002 |
| JP | 62221909 | A | | 9/1987 |
| JP | 01-168511 | | * | 7/1989 |
| JP | 2001-260625 | | * | 9/2001 |
| JP | 2003-112510 | | * | 4/2003 |
| JP | 2005-170195 | | * | 6/2005 |

* cited by examiner

*Primary Examiner*—Paul N. Dickson
*Assistant Examiner*—George D. Spisich
(74) *Attorney, Agent, or Firm*—Morgan Lewis & Bockius LLP

(57) ABSTRACT

A decoupled anti-roll system comprising a left anti-roll bar fastened at one end to a left suspension arm, a right anti-roll bar fastened at one end to a right suspension arm, a clutch mounted to connect or separate the left and right anti-roll bars, oil pressure generating apparatus configured to generate oil pressure during a vehicle roll, an accumulator connected to the oil pressure generating apparatus, and actuators for activating the clutch via the oil pressure generated from the oil pressure generating apparatus to connect or separate the left and right anti-roll bars, whereby the left and right anti-roll bars are connected to each other only when a vehicle rolls, thus improving a car's ride and steering.

5 Claims, 5 Drawing Sheets

(Right Roll)

GENERATION OF A ROLL EXCEEDING
A PREDETERMINED DEGREE

INITIAL POSITION　　　　　　　LOCKED POSITION

DECOUPLED ANTI-ROLL SYSTEM

CROSS-REFERENCE TO RELATED APPLICATIONS

This application claims priority of Korean Application No. 10-2003-0021019, filed on Apr. 3, 2003, the disclosure of which is incorporated fully herein by reference.

FIELD OF THE INVENTION

The present invention relates to a decoupled anti-roll system and, more particularly, to a decoupled anti-roll system where left and right anti-roll bars are connected only when the vehicle body rolls, thus improving ride and steering.

BACKGROUND OF THE INVENTION

Generally, a spring having a small spring constant is used to provide a comfortable vehicle ride. However, the spring having a small spring constant causes the vehicle to roll at an angle toward the outside of the wheel in a turn as a result of a centrifugal force. For this reason, vehicles with independent suspension use an anti-roll bar to reduce wheel rolling and maintain balance of a car body during a turn.

The anti-roll bar is an auxiliary spring that institutes a spring action according to a stroke difference between left and right wheels during rolling. The anti-roll bar is a C-shaped, bent steel rod of which its central part is used as a torsion bar while both ends are respectively fastened to left and right suspension arms. The anti-roll bar does not function as a spring while the left and right wheels are in simultaneous vertical movement. However, when the left and right wheels are respectively in opposite vertical movement or have different strokes, the anti-roll bar reduces inclination of the car body via a spring force generated by a torsion action.

However, there is a drawback in the anti-roll bar thus described in that left and right anti-roll bars are connected to each other, such that road shock to one side of the wheel is transmitted to the other side during a vehicle roll and during an independent ascent or descent of the left or the right wheel as well, thereby reducing the ride comfort and steering of a vehicle.

SUMMARY OF THE INVENTION

Embodiments of the present invention provide a decoupled anti-roll system designed to separate anti-roll bars and then connect the left and right anti-roll bars only during wheel roll, thereby improving ride and steering.

In accordance with a preferred embodiment of the present invention, a decoupled anti-roll system comprises a left anti-roll bar fastened at one end to a left suspension arm. A right anti-roll bar is fastened at one end to a right suspension arm. A clutch is mounted to connect or separate the left and right anti-roll bars. An oil pressure generating apparatus is configured to generate oil pressure during a vehicle rolling. An accumulator is connected to the oil pressure generating apparatus. Actuators activate the clutch via the oil pressure generated from the oil pressure generating apparatus to connect or separate the left and right anti-roll bars. Solenoid valves are respectively mounted to open and close supplementary fluid passages disposed between the accumulator and the oil pressure generating apparatus, and to open and close operational fluid passages disposed between the oil pressure generating apparatus and the actuators. Sensors are installed to detect the ascent and descent of the car axle in relation to the car body. And a controller restricts the solenoid valves in response to a signal from the sensors.

Each of the oil pressure generating apparatus further comprises an oil-filled cylinder fixed at one side to the car axle. A piston rod is fixed at one side to the car body with its head formed with orifices and valves for sliding inside the cylinder and absorbing impact according to the oil flux through the orifices and the valves. A compressed rod is inserted into a compressed chamber formed inside the piston rod along the longitudinal direction for compressively furnishing oil to the actuators as the piston rod slides down.

Each actuator further comprises a cylinder into which oil pressure is applied from the compressed rod. Piston rods slide in the cylinders and activate the clutch according to the oil pressure fed from the compressed rods to the cylinders. A relief valve discharges oil to the accumulator and reduces the inner pressure of the cylinder when the pressure inside the cylinder exceeds a predetermined value according to a high oil pressure fed from the compressed rod.

The clutch further comprises a plurality of movable clutch discs engaged and moved in response to the piston rod of the actuators. Passive clutch discs are respectively formed at one end of the left and right anti-roll bars for contacting to the movable clutch discs in response to the maneuverability of the moveable clutch discs, wherein the surface of each clutch disc is spirally slanted to form a stair at a preset portion.

BRIEF DESCRIPTION OF THE DRAWINGS

For fuller understanding of the nature and objects of the present invention, reference should be made to the following detailed description taken in conjunction with the accompanying drawings in which:

FIG. 6 illustrates a locked state between clutch discs according to the embodiment of the present invention; and.

DETAILED DESCRIPTION OF THE INVENTION

The preferred embodiment of the present invention will now be described in detail with reference to the accompanying drawings.

Figure 1:
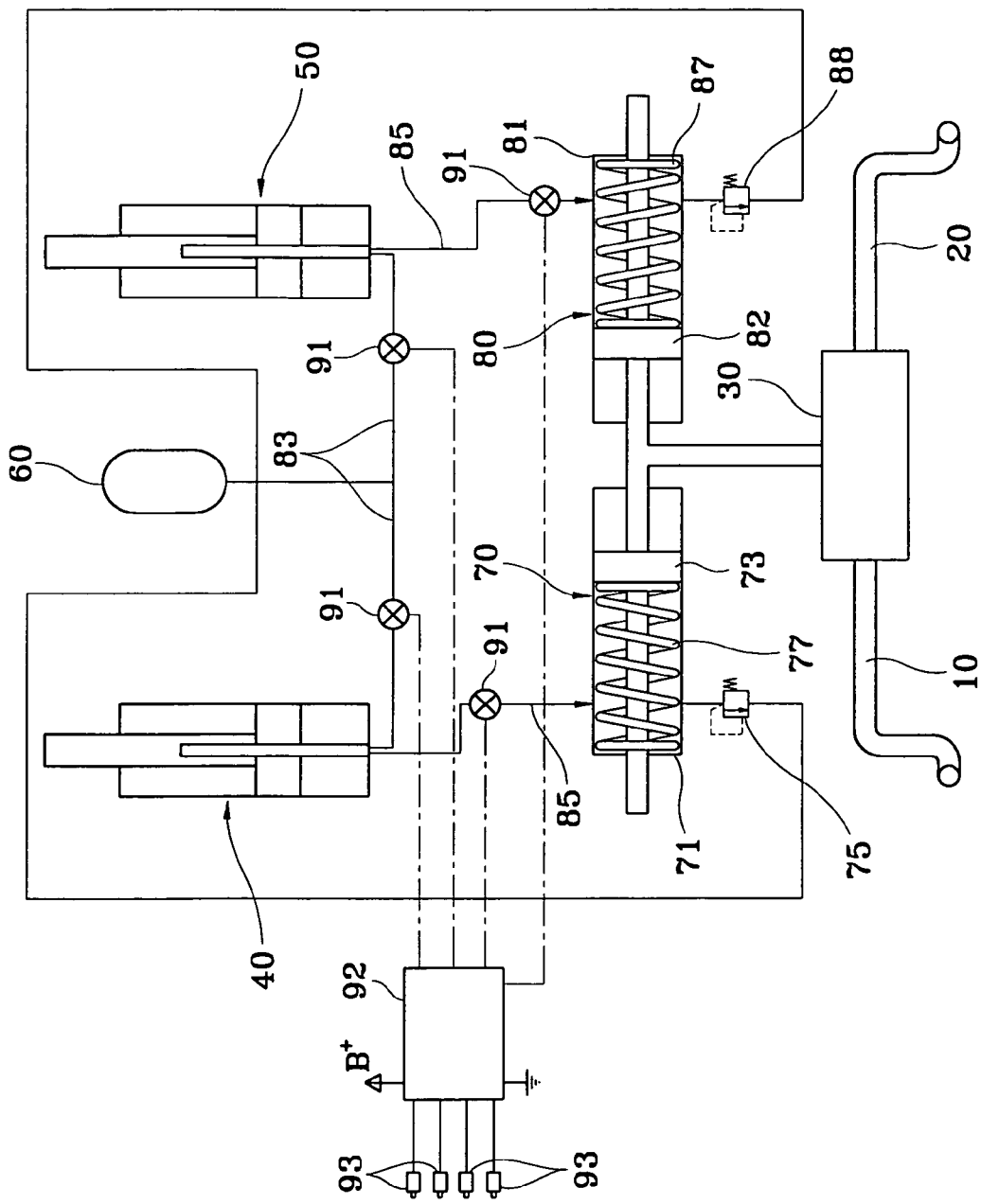
FIG. 1 is a schematic oil pressure circuit diagram of a decoupled anti-roll system according to an embodiment of the present invention.
Figure 2:
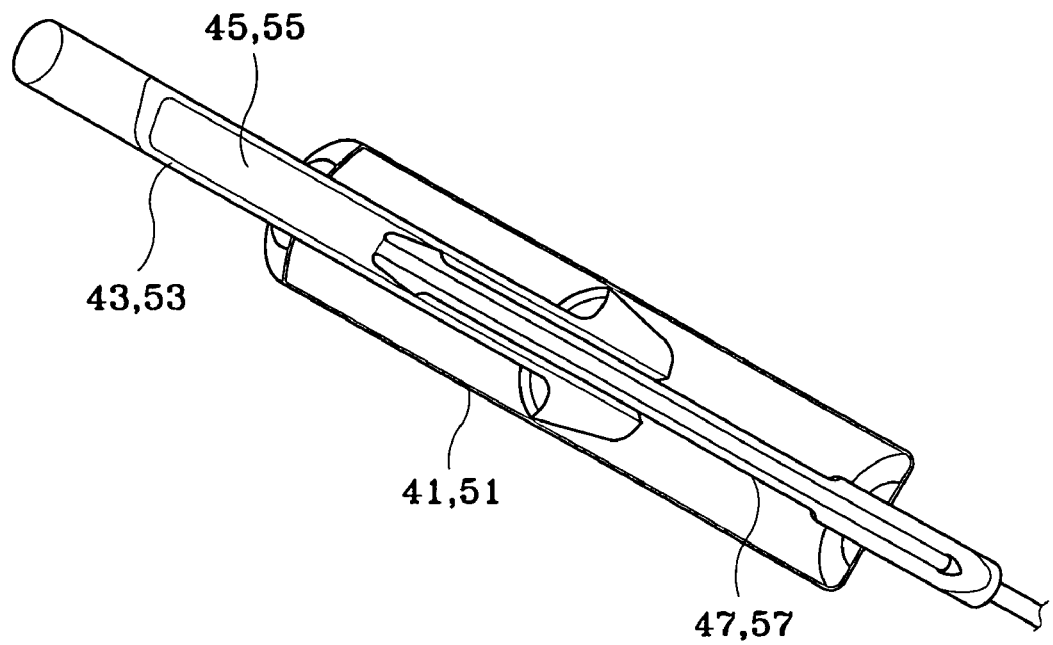
FIG. 2 is a schematic cross-sectional view of an oil pressure generating apparatus according to the embodiment of the present invention.
Figure 3:
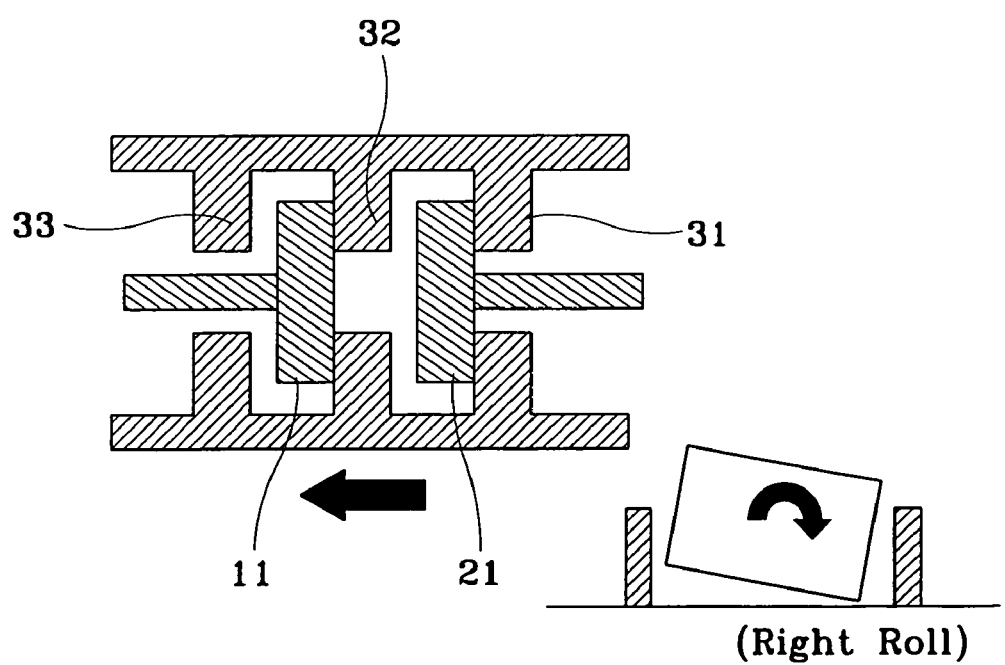
FIG. 3 is a schematic operational view of a clutch during a right roll according to the embodiment of the present invention.
Figure 4:
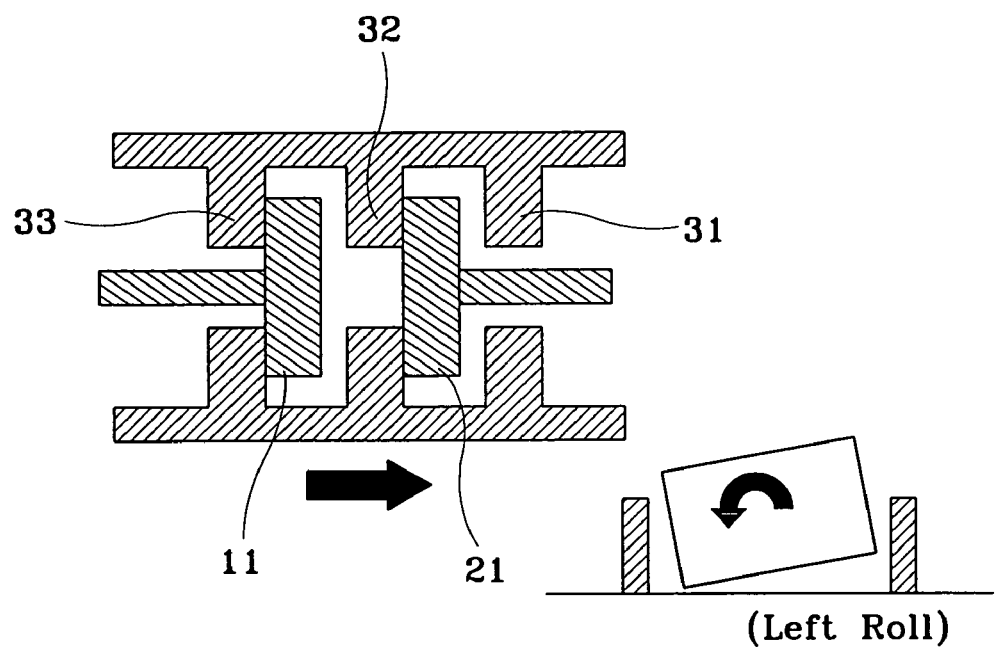
FIG. 4 is a schematic operational view of a clutch during a left roll according to the embodiment of the present invention.
Figure 5:
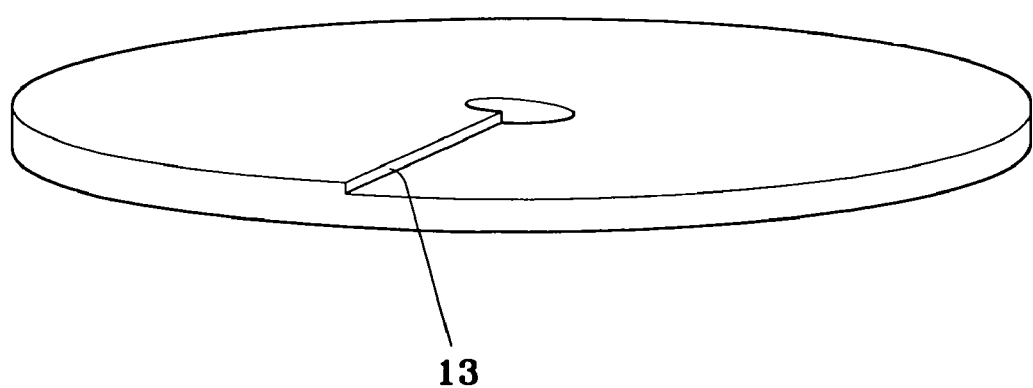
FIG. 5 is a perspective view of a clutch disc according to the embodiment of the present invention.
Figure 6:
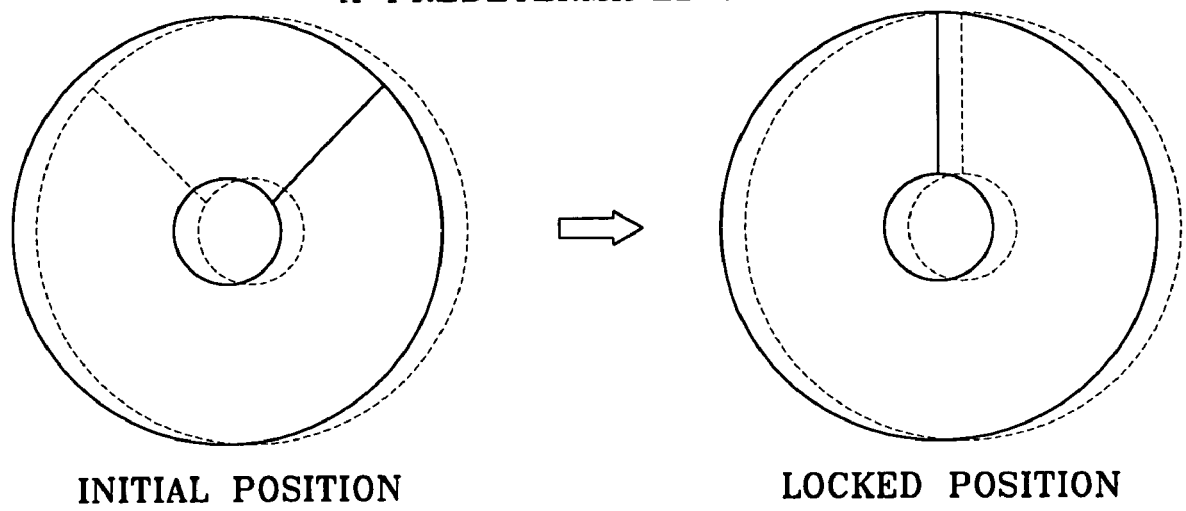
Figure 7:
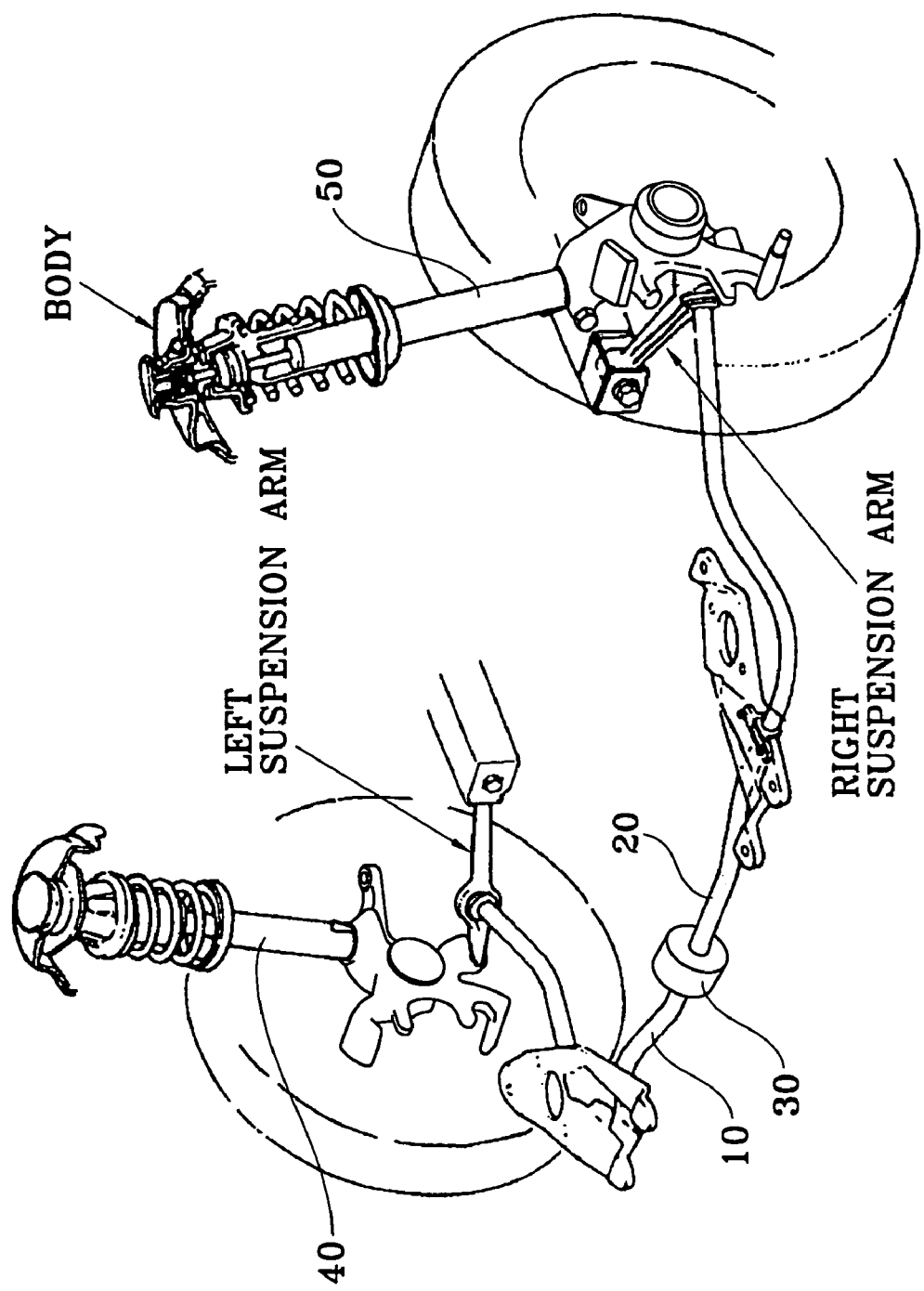
FIG. 7 is a diagrammatic illustration of a decoupled auto roll system according to an embodiment of the present invention.

As shown in FIGS. 1 to 7, a decoupled anti-roll system according to the present invention comprises a left anti-roll bar 10 fastened at one end to a left suspension arm. A right anti-roll bar 20 is fastened at one end to a right suspension arm. The suspension arms and other conventional aspects of the associated suspension are shown in the drawings. A clutch 30 is mounted to either connect or separate the left and right anti-roll bars 10, 20. A left and right oil pressure generating apparatus 40, 50 generate oil pressure during a vehicle roll. An accumulator 60 is connected to the left and right oil pressure generating apparatus 40, 50. A left and right actuator 70, 80 activate the clutch 30 via oil pressure generated from the left and right oil pressure generating apparatus 40, 50 to either connect or separate the left and the right anti-roll bars 10, 20. Solenoid valves 91 are respectively mounted to open and close supplementary fluid passages 83 disposed between the accumulator 60 and the oil pressure generating apparatus 40, 50, and operational fluid passages 85 disposed between the oil pressure generating apparatus 40, 50 and the actuators 70, 80. Sensors 93 detect the ascent and descent of the vehicle axle in relation to the car body. And a controller 92 restricts the solenoid valves 91 in response to a signal from the sensors 93.

Controller 92 may comprise a processor, memory and associated hardware and software may be selected and programmed by a person skilled in the art based on the teachings herein.

Each oil pressure generating apparatus 40, 50 comprises oil-filled cylinders 41, 51 fixed at one side of the car axle. Piston rods 43, 53 are fixed at one side of the car body, and the heads of the piston rods are formed with orifices and valves for sliding inside the cylinders 41, 51 and absorbing impact according to oil flowed through the orifices and the valves. Compressed rods 47, 57 are inserted into compressed chambers 45, 55 formed inside the piston rods 43, 53 along the longitudinal direction for compressively furnishing the oil to the actuators 70, 80 as the piston rods 43, 53 slide down.

Each of the oil pressure generating apparatus serves as a damper to substitute for the conventional shock absorber. The oil pressure generating apparatus cause the oil to flow according to the volume changes of the compressed chambers 45, 55.

The compressed rods 47, 57 include operational fluid passages 85 and supplementary fluid passages 83, connected to the actuators 70, 80 and the accumulator 60, respectively. While a car axle ascends, a high oil pressure is generated by the relative movement of the piston rods 43, 53 and the compressed rods 47, 57 to be supplied to the actuators 70, 80 through the operational fluid passages 85. On the other hand, while the car axle descends, the oil pressure is supplied from the actuator 60 through the supplementary fluid passages 83 by the relative movement of the piston rods 43, 53 and the compressed rods 46, 57.

The supplementary fluid passages 83 and the operational fluid passages 85 are opened/closed by solenoid valves 91 respectively disposed thereon. The solenoid valves 91 are restricted via a controller 92 receiving a signal of the sensor 93 for detecting the ascent and descent of the car axle in relation to the car body.

The actuators 70, 80 include cylinders 71, 81 into which the oil pressure is supplied from the compressed rods 47, 57. Piston rods 73, 82 slide in the cylinders 71, 81 and activate the clutch 30 by the oil pressure fed from the compressed rods 47, 57 to the cylinders 71, 81. Relief valves 75, 88 discharge oil to the accumulator 60 and reduce the inner oil pressure of the cylinders 71, 81 when the pressure inside the cylinders 71, 81 exceeds a predetermined value by a high oil pressure fed from the compressed rods 47, 57. And springs 77, 87 are respectively installed inside the cylinders 71, 81 to centralize the piston rods 73, 82 between two cylinders 41, 51.

The clutch 30 comprises a plurality of movable clutch discs 31, 32, 33 moving in cooperation with the piston rods 73, 82 of the actuators 70, 80. Passive clutch discs 11, 21 are respectively formed at the other end of the left and right anti-roll bars 10, 20 for contacting the movable clutch discs 31, 32, 33 according to the movement of the movable clutch discs 31, 32, 33. The surfaces of the clutch discs 11, 21, 31, 32, and 33 are spirally inclined to form a stair 13 at a preset portion, such that the mutually contacting clutch discs create a gap at a certain angle exceeding a prescribed degree by a vehicle roll, to allow the clutch discs to be locked together by the stair 13 generated on the surfaces of the clutch discs.

The operation and effects of the decoupled anti-roll system according to the present invention will now be described.

The vertical movement of the piston rods 43, 53 during a rolling of the car body causes the oil to flow by contraction or expansion of the volume of the compressed chambers 45, 55. The oil movement thus described prevents rolling of the car body when the clutch 30 is activated.

When the left axle ascends as the rightaxle descends during the rolling of the car body, the sensor 93 detects the ascending and descending movement. The controller 92 manipulates the solenoid valves 91 to close the left and right supplementary fluid passages 83 and to open the left and right operational fluid passages 85.

As the left compressed rod 47 ascends, the volume of the left compressed chamber 45 reduces. Then, the oil slides to the left cylinder 41 through the operational fluid passages 85. Simultaneously, the right compressed rod 57 descends to expand the volume of the right compressed chamber 55 for receiving the oil from the right side cylinder 51.

Thus, the piston rods 73, 82 of the actuators 70, 80 move toward the right side of the car axle by the oil flux. Moreover, the movable clutch discs 31, 32, 33 connected to the actuators 70, 80 move to communicate with the decoupled passive clutch discs 11, 21 of the left and right anti-roll bars 10, 20, thus stiffening the roll of the car body.

Roll stiffness is applied identically in a case where the right car axle ascends and the left car axle descends.

When the left and right car axles ascend simultaneously, the controller 92 closes the left and right supplementary fluid passages 83 and opens the left and right operational fluid passages 85 to allow all the oil pressure generated from the left and right oil pressure generating apparatus 40, 50 to be fed into the cylinders 71, 81.

When the pressure of two cylinders 71, 81 increase at the same time, the piston rods 73, 82 do not move. However, when the pressure of the cylinders 71, 81 exceeds a predetermined degree, the oil is returned to the accumulator 60 via the relief valves 75, 88.

Accordingly, the clutch 30 does not act and the oil pressure generating apparatus 40 and 50 function only as a shock absorber to attenuate the impact in response to the operation of the orifice and valves.

On the other hand, when the left and right car axles simultaneously descend, the controller 92 opens the left and right supplementary fluid passages 83, and closes the left and right operational fluid passages 85. Thus, the oil can be fed from the accumulator 60 to the oil pressure generating apparatus 40, 50.

In this case, the clutch 30 does not activate and the oil pressure generating apparatus 40, 50 function only as the shock absorber to attenuate the road shock in response to the operation of the orifices and valves.

When one of the left or right car axle ascends, the controller 92 detects the motion via the sensor 93 and adjusts the opening and closing of the solenoid valves 91. If only the right side of the car axle ascends, the controller 92 restricts the solenoid valves 91 by closing the left and right operational fluid passages 85 and the left supplementary fluid passage, and opening the right supplementary fluid passage. The oil pressure produced from the right oil pressure generating apparatus 50 is applied not to the right cylinder 81 but to the accumulator 60.

Accordingly, as long as the clutch 30 is not activated, a stiffening of the roll does not occur in the anti-roll bars, thereby causing no bad effects to the steering and ride comfort.

As apparent from the foregoing, there is an advantage in the present invention in that the left and the right anti-roll bars are decoupled from each other but are connected only during rolling, thereby improving a car's ride and steering.

What is claimed is:

1. A decouplable anti-roll system for a vehicle suspension, comprising:
    a left anti-roll bar configured to be fastened at one end to a left suspension arm;
    a right anti-roll bar configured to be fastened at one end to a right suspension arm;
    a clutch mounted to connect or separate said left and right anti-roll bars;
    a plurality of oil pressure generating apparatus configured to generate oil pressure when the vehicle rolls;
    an accumulator connected to said oil pressure generating apparatus;
    actuators for activating said clutch via the oil pressure generated from said oil pressure generating apparatus to connect or separate said left and right anti-roll bars;
    solenoid valves respectively mounted to open and close operational fluid passages disposed between said oil pressure generating apparatus and said actuators, and to open and close supplementary fluid passages disposed between said accumulator and said oil pressure generating apparatus;
    sensors installed to detect relative ascent and descent of a plurality of axles of the vehicle suspension; and
    a controller for restricting said solenoid valves in response to a signal from said sensors
    wherein each of said oil pressure generating apparatus comprises:
        an oil-filled cylinder configured to be mounted at one side to a respective one of said axles;
        a piston rod configured to be mounted at one side to a vehicle body with its head formed with orifices and valves for sliding inside said cylinder and absorbing impact according to the oil flux through said orifices and said valves; and
        a compressed rod inserted into a compressed chamber formed inside said piston rod along the longitudinal direction for compressively furnishing oil to said actuators as said piston rod slides down.

2. The system as defined in claim 1, wherein each of said actuators further comprises:
    a cylinder into which the oil pressure is applied from said compressed rod; and
    a piston rod for sliding in said cylinder and activating said clutch according to the oil pressure fed from said compressed rod to said cylinder.

3. The system as defined in claim 2, wherein each of said actuators further comprises:
    a relief valve that discharges oil to said accumulator and reduces the inner pressure of said cylinder when the inner pressure of said cylinder is in excess of a predetermined value according to a high oil pressure fed from said compressed rod.

4. The system as defined in claim 2, wherein said clutch further comprises:
    a plurality of movable clutch discs which move and become engaged in response to said piston rod of said actuators; and
    passive clutch discs respectively formed at one end of said left and right anti-roll bars for contacting said movable clutch discs in response to the movement of said moveable clutch discs.

5. The system as defined in claim 4, wherein the surface of each said clutch discs is spirally slanted to form a stair at a preset portion.

* * * * *